(No Model.)
J. C. CROPPER.
AXLE LUBRICATOR.
No. 474,652. Patented May 10, 1892.
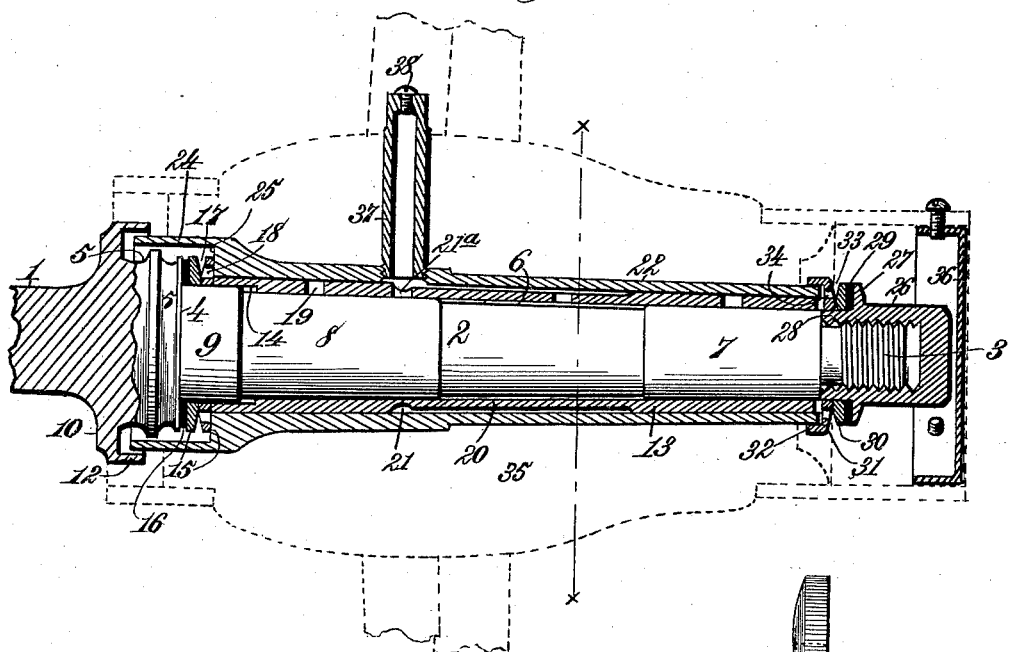
Fig. 1.
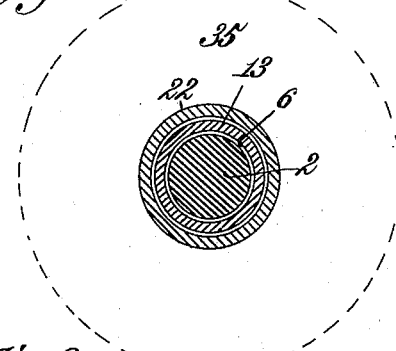
Fig. 2.
Fig. 5.
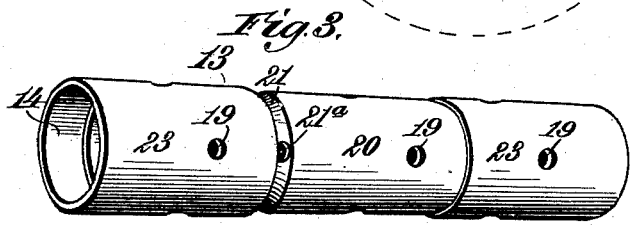
Fig. 3.
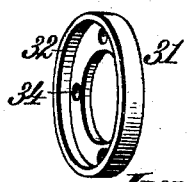
Fig. 4.
Witnesses.
Robert Everett.
J. A. Rutherford.
Inventor:
Joseph C. Cropper.
By James L. Norris.
Atty.

UNITED STATES PATENT OFFICE.

JOSEPH C. CROPPER, OF CEDAR FALLS, IOWA.

AXLE-LUBRICATOR.

SPECIFICATION forming part of Letters Patent No. 474,652, dated May 10, 1892.

Application filed January 8, 1892. Serial No. 417,379. (No model.)

*To all whom it may concern:*

Be it known that I, JOSEPH C. CROPPER, a citizen of the United States, residing at Cedar Falls, in the county of Black Hawk and State of Iowa, have invented new and useful Improvements in Self-Lubricating Vehicle-Axles, of which the following is a specification.

My invention relates to axles for track-sulkies and other vehicles; and the purpose thereof is to provide a simple construction by which friction shall be materially diminished, the wear of the axle-box and journal prolonged, and the wheel caused to run thereon without lateral play and silently.

It is my purpose, also, to provide a self-lubricating axle for track-sulkies and other vehicles, having novel means for taking up the thrust of the wheel-hub in turning and for preventing endwise wear of the parts due to such end-thrust.

It is a further purpose of my invention to provide novel and simple means for excluding sand, dirt, and other foreign matter from the interior of the axle-box, and to combine with the latter an anti-friction sleeve or bushing intermediate between the axle-journal and axle-box, both axle-box and sleeve having bearing at each end upon a series of independent anti-friction collars running loosely upon bearing-surfaces separated from the journal.

The invention consists, to these ends, in the several novel features of construction and new combinations of parts hereinafter fully described, and then particularly pointed out in the claims following and concluding this specification.

To enable others skilled in the art to make, construct, and use the said invention, I will describe the same in detail, reference being made for such purpose to the accompanying drawings, in which—

Figure 1 is a central longitudinal section taken through the vehicle-hub, axle-box, and anti-friction sleeve. Fig. 2 is a cross-section in the line *x x*, Fig. 1. Fig. 3 is a detail view of the anti-friction sleeve removed from the axle. Fig. 4 is a detail view of the flanged collar seated on the axle-nut and engaging the end of the box. Fig. 5 is an enlarged detail view of the metallic anti-friction collars.

In the said drawings the reference-numeral 1 indicates the axle proper, which may be of any speed and track sulky or other vehicle. Upon the end of said axle is shown the journal 2, having the usual slight taper, by which its extremity is of reduced diameter as compared with the end next the axle. The smaller extremity is provided with the reduced threaded point 3 to receive the nut, and upon the opposite extremity is formed the thrust-collar 4, which I provide with two peripheral channels or grooves 5 upon opposite sides of a central portion of said collar, which is of somewhat greater diameter than the two outer edges, as shown in Fig. 1.

Between the two ends of the axle I remove a small portion of the metal by turning the same off in a lathe to form a shallow annular recess or chamber 6, between which and the two ends of the journal lie contact-surfaces 7 and 8 of suitable length. Between the innermost of these surfaces 8 and the thrust-collar 4 is formed an enlargement composing an annular bearing 9, integral at one end with the outer face of said collar. Between this thrust-collar 4 and the axle proper lies the sand or dust collar 10, which is provided with an outwardly-turned flange 12.

The reference-numeral 13 indicates the anti-friction sleeve or bushing, which is constructed of brass, bronze, or any other metal or metallic compound possessing good wearing and non-frictional qualities. Upon its interior this sleeve corresponds in shape and diameter with the outer face of the journal 2, upon which it rests, its inner end being provided with a counterbore 14 to receive the outer portion of the enlarged annular bearing 9, upon which are slipped two or more anti-friction collars 15. I preferably employ three of these collars, one of which 16 lies against the thrust-collar 4 and is formed of some suitable non-metallic material, such as vulcanized fiber. I may use for this purpose any material which possesses the proper toughness of fiber. The remaining collars 15 are metallic and are slightly convex upon their adjacent faces or upon the outer marginal portions of said faces, whereby a narrow space 17 will be formed when said collars are forced together, said space being of constantly-diminishing width from the periphery inward. In the outer collar 15 I form oil-openings 18 at suitable intervals, whereby oil may pass into the space 17, which forms an oil-receiving and oil-holding recess. The collars 15 and 16 are of such thickness that the inner end of the anti-friction sleeve 13 abuts against the outer collar. This anti-friction sleeve 13 has a perfectly plane interior face, but has bearing upon the journal 2 upon its end portions or upon the contact-surfaces 7 and 8 only, the slight reduction of the middle portion of the journal forming a space or chamber of annular form, which will serve to retain a body of oil. Perforations or oil-openings 19 are formed in the sleeve at suitable intervals to permit the passage of oil, and the middle portion of the sleeve is slightly reduced in exterior diameter over a space about equal or somewhat in excess of the length of the reduced portion 6 of the journal 2. At or near the inner end of this exterior reduced portion 20 of the sleeve is formed an exterior circumferential channel 21, in which is formed a single oil-opening 21ª.

Upon the anti-friction sleeve 13 rests the axle-box 22, the plane-faced interior of which has bearing upon the sleeve 13 upon the two end portions 23, which are between the ends of the sleeve and its reduced middle portion 20. The inner end of the axle-box is enlarged and provided with a counterbore 24, which receives the washers 15 and 16 and the thrust-collar 4, the enlarged end entering and fitting within the outwardly-turned flange 12 on the dust-collar. The outer end of the axle-box is substantially flush with the end of the anti-friction sleeve 13. At its other or inner end the shoulder 25 of the counterbore abuts against the outer collar 15.

The numeral 26 indicates the nut, which is turned upon the reduced threaded point 3 of the journal. This nut is a thimble-nut or cap-nut closed at its outer end and provided with a circumferential collar 27, beyond which projects a short neck 28, upon which I place a non-metallic collar 29, substantially similar to the collar 16, its outside diameter being equal, or substantially so, to that of the collar 27, the periphery of which is about flush with the end of the axle-box 22. Against the non-metallic collar 29 is placed a metallic collar 30, the face of which lying next to the journal 2 being slightly convex throughout the whole or a portion thereof. Against this collar 30 is placed a collar 31, having an inwardly-turned flange 32, which surrounds the end of the axle-box. The outer face of this collar, which abuts against the collar 30, is of a like convex formation, whereby an annular oil-holding recess 33 is formed, the oil finding access thereto by the perforations 34 in the collar 31. The slight convexity of the contacting faces of the collars 30 and 31 also reduces the friction-surface and enables said collars to turn more easily one upon the other. The hub 35 is united with the box 22 in any ordinary or preferred manner, a dust-cap or shield 36 being mounted upon the outer end of the hub, which is recessed to inclose the nut. A suitable recess is also provided at the other end of the hub to receive the dust-collar 10.

Through the hub is inserted an oil-cup 37, having radial arrangement, its end being tapped into the axle-box 22 at such a point that it will discharge into the circumferential channel 21 of the sleeve. This cup may be of any preferred form; but a simple tube closed at its upper end by a screw 38 is practically all that is necessary.

My invention is especially adapted to track-sulkies to relieve friction, to prevent all jar and trembling in turning corners under speed, to prevent increased friction from lateral thrust, and to take up the wear produced by end-thrust.

It is evident that I may form the annular chamber 6 by removing a small portion of the inner face of the sleeve, and in like manner, instead of cutting away the exterior of the sleeve to form the reduced portion 20, I may remove a portion of the interior face of the box.

I usually construct the anti-friction sleeve of good steel, but it may be of brass or any suitable composition of metal. I may also form said sleeve of wire close-coiled upon a mandrel having the size and shape of the axle.

What I claim is—

1. In a self-lubricating axle for track-sulkies and other vehicles, the combination, with the journal having a thrust-collar at its inner end and a dust-collar provided with an outwardly-turned flange, of an anti-friction sleeve inclosing said journal and revoluble thereon, a series of friction-collars between the dust-collar and the sleeve, a series of friction-collars mounted on a prolongation of the nut between a peripheral collar on the same and the end of the sleeve, and an axle-box having a counterbore inclosing the collars at the inner end of the journal, the enlarged end of the box lying within the flange of the dust-collar and its outer end abutting against the collar, sustaining the thrust of the outer end of the sleeve, substantially as described.

2. In a self-lubricating axle for track-sulkies and other vehicles, the combination, with the journal, an axle-box, and an anti-friction sleeve arranged on said journal between the same and the box, of a series of friction-collars at each end of said sleeve, the contacting faces of two or more of said collars being of slightly-convex formation partly or entirely throughout the same to form oil-holding recesses, and collars arranged between the ends of the sleeve and the contacting collars and provided with oil-openings, substantially as described.

3. In a self-lubricating axle for track-sulkies and other vehicles, the combination, with a journal having a thrust-collar at its inner end and a dust-collar between the thrust-collar and the axle proper, of a series of anti-friction collars arranged upon an enlargement of the journal and abutting against the thrust-collar, an anti-friction sleeve inclosing the journal and having its counterbored end abutting against said washers, a nut turned upon the point of the axle and having a peripheral collar, and a series of anti-friction collars mounted on a prolongation of the nut and abutting against the peripheral collar and the outer end of the anti-friction sleeve, substantially as described.

4. In a self-lubricating axle for track-sulkies and other vehicles, the combination, with a journal, of an anti-friction sleeve fitting thereon, a series of collars at the inner end between the sleeve, and a thrust-collar on the axle, the contacting faces of said collars being slightly convex throughout the whole or a part of said surface, and a series of collars between a collar on the nut and the outer end of the anti-friction sleeve, substantially as described.

5. In a self-lubricating axle for track-sulkies and other vehicles, the combination, with a journal provided with a thrust-collar at its inner end, of an anti-friction sleeve, an axle-box fitting loosely on said sleeve, and an oil-cup communicating with its interior and discharging into a circumferential channel in the outer face of the sleeve, said channel provided with a single perforation and the sleeve having a series of perforations at intervals, substantially as described.

In testimony whereof I have hereunto set my hand and affixed my seal in presence of two subscribing witnesses.

JOSEPH C. CROPPER. [L. S.]

Witnesses:
C. C. KNAPP,
WILL H. KNAPP.